(12) United States Patent
Nakamura

(10) Patent No.: US 9,970,404 B2
(45) Date of Patent: May 15, 2018

(54) CONTROL APPARATUS FOR INTERNAL COMBUSTION ENGINE

(71) Applicant: Toyota Jidosha Kabushiki Kaisha, Toyota-shi, Aichi-ken (JP)

(72) Inventor: Satoshi Nakamura, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 202 days.

(21) Appl. No.: 15/204,496

(22) Filed: Jul. 7, 2016

(65) Prior Publication Data

US 2017/0009727 A1    Jan. 12, 2017

(30) Foreign Application Priority Data

Jul. 10, 2015  (JP) ................. 2015-138873

(51) Int. Cl.
*F02D 41/00*   (2006.01)
*F02P 5/145*   (2006.01)
(Continued)

(52) U.S. Cl.
CPC .......... *F02P 5/145* (2013.01); *F02D 41/3094* (2013.01); *F02P 5/045* (2013.01); *F02P 5/15* (2013.01); *F02P 11/00* (2013.01); *F02D 37/02* (2013.01); *F02D 41/0002* (2013.01); *F02D 2011/102* (2013.01); *Y02T 10/46* (2013.01)

(58) Field of Classification Search
CPC .... F02P 5/15; F02P 5/045; F02P 11/00; F02D 41/0002; F02D 41/3094; F02D 2011/102; Y02T 10/46

See application file for complete search history.

(56) References Cited

U.S. PATENT DOCUMENTS 3,354,387 A * 11/1967 Whaley ................... F02P 17/00
                                                          315/209 T
4,964,377 A * 10/1990 Scarnera ................. F02P 3/005
                                                          123/604

(Continued)

FOREIGN PATENT DOCUMENTS

JP    2002180941 A    6/2002
JP    2003028037 A    1/2003

(Continued)

*Primary Examiner* — Hieu T Vo
*Assistant Examiner* — Sherman Manley
(74) *Attorney, Agent, or Firm* — Dinsmore & Shohl LLP

(57) ABSTRACT

An ECU outputs an ignition signal and a discharge waveform control signal. An ignition device closes an ignition switching element in a period during which the ignition signal is input. After a stop of the input of the ignition signal and in a period of input of the discharge waveform control signal, the ignition device controls current flowing through a primary coil to a discharge current command value that is determined by the discharge waveform control signal by opening or closing a control switching element. A discharge control unit determines whether there is an abnormality. When it is determined that there is an abnormality, the ECU avoids control executed by the discharge control unit, and causes the discharge control unit to execute control during times of low-rotation and low-load operation of an internal combustion engine in order to determine whether the discharge control unit has returned to a normal state.

7 Claims, 6 Drawing Sheets

(51) Int. Cl.
   *F02P 5/04*      (2006.01)
   *F02D 41/30*    (2006.01)
   *F02P 5/15*      (2006.01)
   *F02P 11/00*    (2006.01)
   *F02D 37/02*        (2006.01)
   *F02D 11/10*        (2006.01)

(56) References Cited

U.S. PATENT DOCUMENTS

| | | | | |
|---|---|---|---|---|
| 5,337,717 A * | 8/1994 | Scheel | ........... | F02P 3/0861 |
| | | | | 123/406.19 |
| 5,895,839 A * | 4/1999 | Takahashi | ........... | F02P 17/12 |
| | | | | 123/406.26 |
| 6,222,346 B1 * | 4/2001 | Mori | ........... | H02J 7/0031 |
| | | | | 320/134 |
| 6,526,953 B1 * | 3/2003 | Inagaki | ........... | F02P 3/0435 |
| | | | | 123/609 |
| 7,685,999 B2 * | 3/2010 | Toriyama | ........... | F02P 3/053 |
| | | | | 123/620 |
| 8,861,175 B2 * | 10/2014 | Godo | ........... | F23Q 3/004 |
| | | | | 361/263 |
| 2002/0043255 A1 * | 4/2002 | Kameda | ........... | F02P 3/0456 |
| | | | | 123/606 |
| 2004/0200463 A1 * | 10/2004 | Ando | ........... | F02P 3/0435 |
| | | | | 123/630 |
| 2007/0252744 A1 * | 11/2007 | Takeuchi | ........... | H03M 1/1076 |
| | | | | 341/155 |
| 2008/0007266 A1 * | 1/2008 | Enomoto | ........... | F02P 9/002 |
| | | | | 324/380 |
| 2010/0122689 A1 * | 5/2010 | Tanaya | ........... | F02D 35/021 |
| | | | | 123/406.26 |
| 2011/0247598 A1 * | 10/2011 | Tanaya | ........... | F02P 17/12 |
| | | | | 123/594 |
| 2016/0061177 A1 | 3/2016 | Ishitani et al. | | |

FOREIGN PATENT DOCUMENTS

| | | |
|---|---|---|
| JP | 2007046474 A | 2/2007 |
| JP | 2011208522 A | 10/2011 |
| JP | 2014206061 A | 10/2014 |
| JP | 2014218997 A | 11/2014 |

* cited by examiner

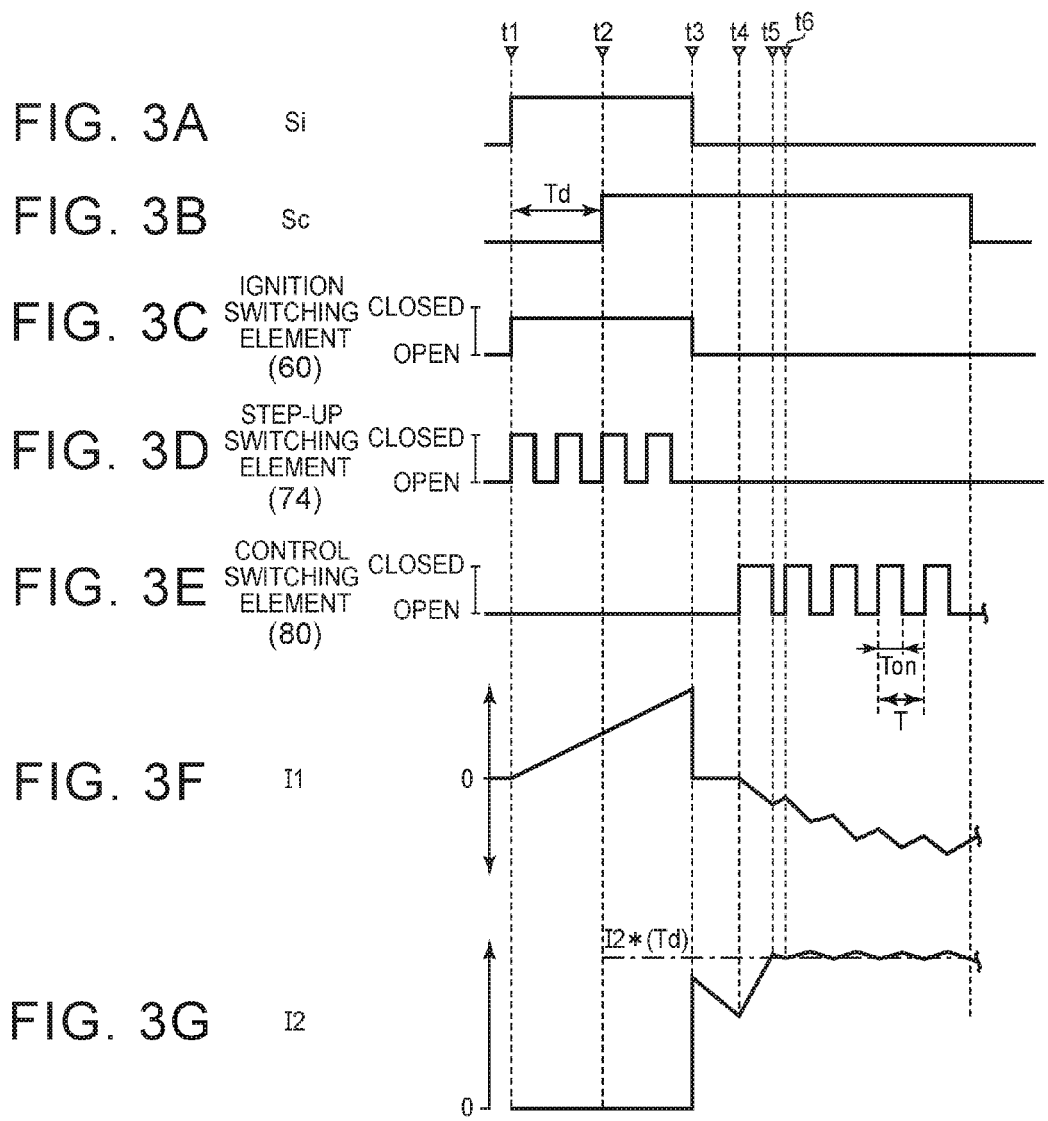

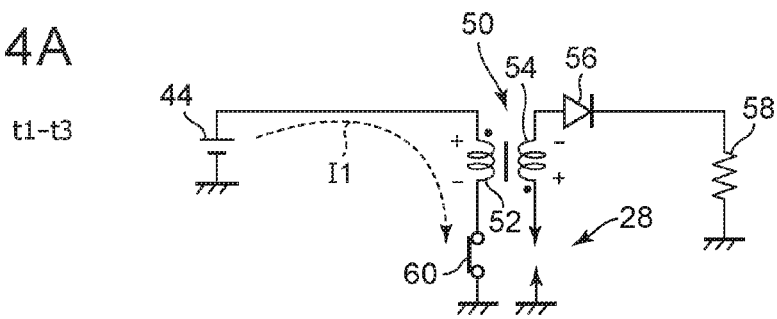
FIG. 4A  t1-t3
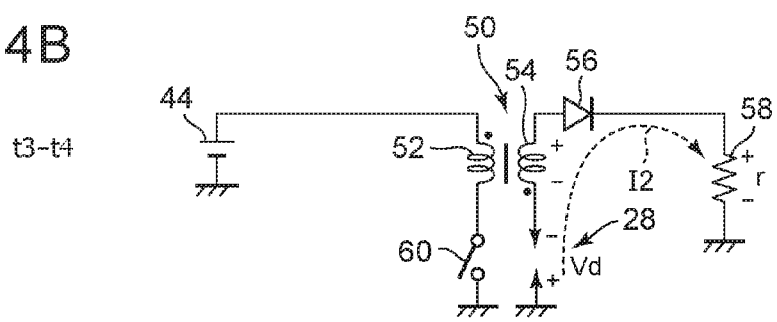
FIG. 4B  t3-t4
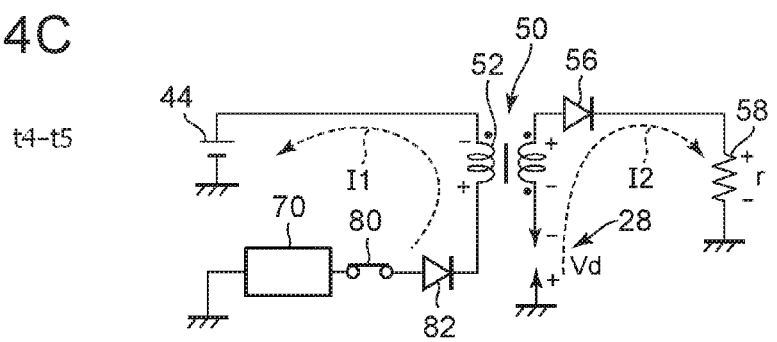
FIG. 4C  t4-t5
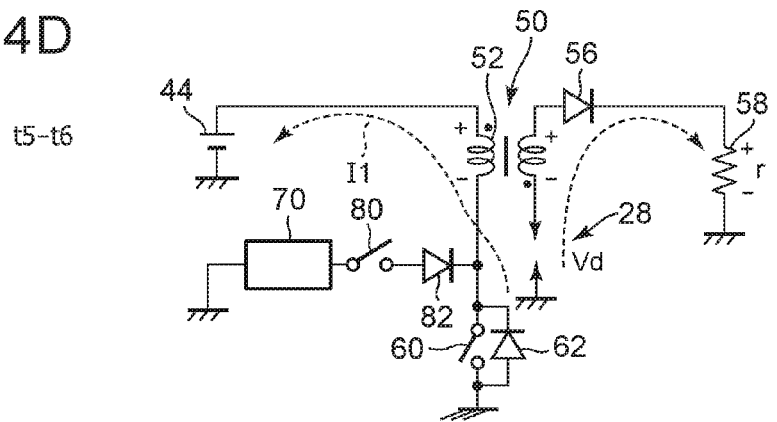
FIG. 4D  t5-t6

CONTROL APPARATUS FOR INTERNAL COMBUSTION ENGINE

CROSS-REFERENCE TO RELATED APPLICATIONS

This application claims priority to Japanese Patent Application No. 2015-138873 filed on Jul. 10, 2015, the entire contents of which are hereby incorporated by reference.

BACKGROUND

1. Technical Field

The present disclosure relates to a control apparatus for an internal combustion engine, which controls a controlled amount of the internal combustion engine by operating an ignition device including a spark plug provided in a combustion chamber of the internal combustion engine, an ignition coil connected to the spark plug, a discharge control circuit that retains discharge current after a start of discharging of the spark plug, and a discharge control unit that controls the discharge current by operating the discharge control circuit.

2. Description of Related Art

For example, Japanese Patent Application Publication No. 2003-28037 (JP 2003-28037 A) suggests an ignition device including a capacitor discharge ignition (CDI; hereinafter, referred to as main circuit) that energizes a primary coil of an ignition coil and an auxiliary circuit that is utilized in ignition control instead of the main circuit when an abnormality of the main circuit has been detected.

On the other hand, Japanese Patent Application Publication No. 2014-206061 (JP 2014-206061 A) suggests an ignition device including a discharge control circuit that retains discharge current after a start of discharging of a spark plug and a discharge control unit that controls the discharge current by operating the discharge control circuit.

Incidentally, in the case of the ignition device described in JP 2014-206061 A, it is conceivable that there can be a situation that an abnormality of the discharge control circuit or discharge control unit is detected but an abnormality of a circuit that starts discharging of the spark plug is not detected. In this case, it is conceivable that, instead of the auxiliary circuit described in JP 2003-28037 A, the circuit that starts discharging of the spark plug is allowed to be utilized in fail-safe process at the time when an abnormality of the discharge control circuit or discharge control unit has been detected.

Incidentally, the inventors found that ignition devices brought into dealers by users who are informed of abnormalities of the ignition devices include normal ones. This suggests that there is an ignition device of which an abnormality had been once detected and that has returned to a normal state thereafter. However, when the fail-safe process as in the case of the technique described in JP 2003-28037 A is continued, even when an ignition device that had been determined to be abnormal has returned to a normal state, this normal state cannot be detected. For this reason, it is not possible to effectively utilize an ignition device that has returned to a normal state.

SUMMARY

The present disclosure provides a control apparatus for an internal combustion engine, which is able to detect that, after an abnormality of a discharge control circuit that retains discharge current after a start of discharging of a spark plug or an abnormality of a discharge control unit that controls the discharge current by operating the discharge control circuit had been detected, the discharge control circuit or the discharge control unit has returned to a normal state.

An aspect of the present disclosure provides a control apparatus for an internal combustion engine. The control apparatus includes an ignition device and an electronic control unit. The ignition device includes a spark plug, an ignition coil, a discharge control circuit and a discharge control unit. The spark plug is provided in a combustion chamber of the internal combustion engine. The ignition coil is connected to the spark plug. The discharge control circuit is configured to retain discharge current after a start of discharging of the spark plug. The discharge control unit is configured to control the discharge current by operating the discharge control circuit. The electronic control unit is configured to (i) control a controlled amount of the internal combustion engine by operating the ignition device, (ii) determine whether there is an abnormality in at least one of the discharge control unit and the discharge control circuit, (iii) when the electronic control unit determines that there is the abnormality in at least one of the discharge control unit and the discharge control circuit, avoid control over the discharge current by the discharge control unit, and (iv) after the electronic control unit determines that there is the abnormality in at least one of the discharge control unit and the discharge control circuit, cancel avoidance of control over the discharge current, and determine whether the at least one of the discharge control unit and the discharge control circuit has returned from the abnormality by causing the discharge control unit to execute control for bringing the discharge current to a discharge current smaller than or equal to a minimum value during times when the electronic control unit does not determine that there is the abnormality.

With the thus configured control apparatus for an internal combustion engine, after there occurs an abnormality in at least one of the discharge control unit and the discharge control circuit, the electronic control unit determines whether the at least one of the discharge control unit and the discharge control circuit has returned from the abnormal state by causing the discharge control unit to control the discharge current. For this reason, after the electronic control unit determines that there is an abnormality in the discharge control unit or the discharge control circuit, when the discharge control unit or the discharge control circuit becomes available in a normal state (when the discharge control unit or the discharge control circuit has returned to a normal state), it is possible to detect that the discharge control unit or the discharge control circuit has returned to a normal state.

However, because a behavior during abnormal times can differ from a behavior that is assumed during normal times, there is a concern that, depending on the type of abnormality, there can occur a situation that the ignition device excessively generates heat due to the fact that the ignition device exhibits a behavior different from a behavior that is assumed during normal times when the discharge control unit is caused to control the discharge current. In terms of this point, with the above-described control apparatus for an internal combustion engine, at the time of causing the discharge control unit to control the discharge current in a state where the electronic control unit determines that there is an abnormality, it is possible to minimize excessive heat generation of the ignition device by executing control for limiting the discharge current.

In the control apparatus for an internal combustion engine, the electronic control unit may be configured to: (i)

when the discharge control unit is not caused to control the discharge current after a start of discharging of the spark plug, adjust air-fuel mixture in the combustion chamber to a low ignition state where ignitability of the air-fuel mixture is lower than or equal to a predetermined ignitability, (ii) when the air-fuel mixture has been adjusted to the low ignition state, cause the discharge control unit to control the discharge current, (iii) when the electronic control unit determines that there is the abnormality in at least one of the discharge control unit and the discharge control circuit, stop adjusting the air-fuel mixture to the low ignition state, and, when the discharge control unit is not caused to control the discharge current after the start of discharging of the spark plug, adjust air-fuel mixture in the combustion chamber to a high ignition state where ignitability of the air-fuel mixture exceeds the predetermined ignitability, and (iv) cancel avoidance of control over the discharge current during times when the air-fuel mixture is placed in the high ignition state, and cause the discharge control unit to control the discharge current.

In the thus configured control apparatus for an internal combustion engine, when air-fuel mixture is adjusted to the low ignition state, a decrease in the ignitability of air-fuel mixture is prevented or reduced by causing the discharge control unit to control the discharge current. When the electronic control unit determines that there is an abnormality in the discharge control unit or the discharge control circuit, adjusting air-fuel mixture to the low ignition state is stopped, and air-fuel mixture is adjusted to the high ignition state. For this reason, even when control over the discharge current by the discharge control unit is avoided, it is possible to prevent or reduce a decrease in the ignitability of air-fuel mixture.

Avoidance of control over the discharge current is cancelled during times when air-fuel mixture is adjusted to the high ignition state, and the discharge control unit is caused to control the discharge current. The combustion temperature of air-fuel mixture in the high ignition state tends to be higher than the combustion temperature of air-fuel mixture in the low ignition state. For this reason, when the discharge control unit is caused to control the discharge current in the high ignition state, there is a concern that the temperature of the ignition device is higher than that during normal times when the discharge control unit is caused to control the discharge current in the low ignition state. In terms of this point, with the above-described control apparatus for an internal combustion engine, it is possible to suitably prevent or reduce such a high temperature of the ignition device by limiting the magnitude of discharge current that is controlled by the discharge control unit.

In the control apparatus for an internal combustion engine, the electronic control unit may be configured to (i) control an air-fuel ratio of air-fuel mixture in the combustion chamber to a value larger than or equal to a predetermined air-fuel ratio leaner than a stoichiometric air-fuel ratio, and (ii) control the air-fuel ratio of air-fuel mixture in the combustion chamber to a value smaller than the predetermined air-fuel ratio.

As the air-fuel ratio becomes somewhat leaner than the stoichiometric air-fuel ratio, the ignitability decreases in the case where the discharge control unit is not caused to control the discharge current after a start of discharging of the spark plug. Therefore, because the air-fuel ratio is controlled to a value larger than or equal to the predetermined air-fuel ratio, air-fuel mixture is adjusted to the low ignition state. The combustion temperature of air-fuel mixture in this case can be lower than that in the case where the air-fuel ratio of air-fuel mixture is richer.

In the control apparatus for an internal combustion engine, the electronic control unit may be configured to, on a condition that a rotation speed of the internal combustion engine is lower than or equal to a predetermined speed, cancel avoidance of control over the discharge current, and cause the discharge control unit to control the discharge current.

With the thus configured control apparatus for an internal combustion engine, the discharge control unit is caused to execute control on the condition that the rotation speed of the internal combustion engine is lower than or equal to the predetermined speed, so it is possible to cause the discharge control unit to execute control when air flow in the combustion chamber is not large. When air flow is large, discharge current between the pair of electrodes of the spark plug is elongated. In terms of this point, with the above-described control apparatus for an internal combustion engine, it is possible to prevent or reduce elongation of the discharge current, so it is possible to decrease the voltage between the pair of electrodes of the spark plug, which is required in controlling the discharge current. Therefore, it is possible to limit discharge energy and, by extension, it is possible to prevent or reduce heat generation of the ignition device.

In the control apparatus for an internal combustion engine, the electronic control unit may be configured to, on a condition that a load of the internal combustion engine is smaller than or equal to a predetermined value, cancel avoidance of control over the discharge current, and cause the discharge control unit to control the discharge current.

When the load of the internal combustion engine is small, as compared to when the load is large, the voltage between both electrodes of the spark plug, which is required in controlling the discharge current to a predetermined discharge current, decreases. In the above-described control apparatus for an internal combustion engine, in consideration of this point, the discharge control unit is caused to execute control on the condition that the load is smaller than or equal to the predetermined value, so it is possible to cause the discharge control unit to execute control when the voltage between both electrodes of the spark plug, which is required in controlling the discharge current to a predetermined discharge current, is low. Therefore, it is possible to limit discharge energy resulting from causing the discharge control unit to execute control, and, by extension, it is possible to prevent or reduce heat generation of the ignition device.

In the control apparatus for an internal combustion engine, the electronic control unit may be configured to, when a detected value of discharge current in a period during which the discharge control unit is caused to control the discharge current is smaller than or equal to a threshold, determine that there is the abnormality.

With the thus configured control apparatus for an internal combustion engine, the electronic control unit determines that there is an abnormality when the detected value of discharge current is small during times when the discharge current is controlled by the discharge control unit. For this reason, a situation that the discharge control unit is not normally caused to control the discharge current and it is not possible to improve the ignitability of air-fuel mixture is accurately recognized.

In the control apparatus for an internal combustion engine, the ignition device may include an ignition switching element and a control switching element. The ignition switching element may be configured to open or close a first loop circuit including a first power supply and a primary coil of the ignition coil. The control switching element may be configured to open or close a second loop circuit including a second power supply and the primary coil. The discharge control circuit may include the control switching element. The discharge control unit may be configured to (i) discharge the spark plug by using electromotive force that is generated in a secondary coil of the ignition coil as a result of switching of the ignition switching element from a closed state to an open state, (ii) after discharging of the spark plug, control the discharge current of the spark plug by opening or closing the control switching element, and (iii) a polarity of voltage that is applied by the first power supply to the primary coil during times when the first loop circuit is a closed loop and a polarity of voltage that is applied by the second power supply to the primary coil during times when the second loop circuit is the closed loop are reverse from each other.

With the thus configured control apparatus for an internal combustion engine, voltage having a reverse polarity to voltage applied to the primary coil during times when the first loop circuit is a closed loop is applied to the primary coil by closing the control switching element. When the absolute value of current flowing through the primary coil is increased by opening or closing the control switching element, it is possible to control the discharge current of the spark plug in response to the rate of increase.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 3A is a timing chart that illustrates ignition control according to one or more embodiments shown and described herein;

FIG. 3B is a timing chart that illustrates ignition control according to one or more embodiments shown and described herein;

FIG. 3C is a timing chart that illustrates ignition control according to one or more embodiments shown and described herein;

FIG. 3D is a timing chart that illustrates ignition control according to one or more embodiments shown and described herein;

FIG. 3E is a timing chart that illustrates ignition control according to one or more embodiments shown and described herein;

FIG. 3F is a timing chart that illustrates ignition control according to one or more embodiments shown and described herein;

FIG. 3G is a timing chart that illustrates ignition control according to one or more embodiments shown and described herein;

FIG. 4A is a circuit diagram that illustrates ignition control according to one or more embodiments shown and described herein;

FIG. 4B is a circuit diagram that illustrates ignition control according to one or more embodiments shown and described herein;

FIG. 4C is a circuit diagram that illustrates ignition control according to one or more embodiments shown and described herein;

FIG. 4D is a circuit diagram that illustrates ignition control according to one or more embodiments shown and described herein;

DETAILED DESCRIPTION OF EMBODIMENTS

Figure 1:
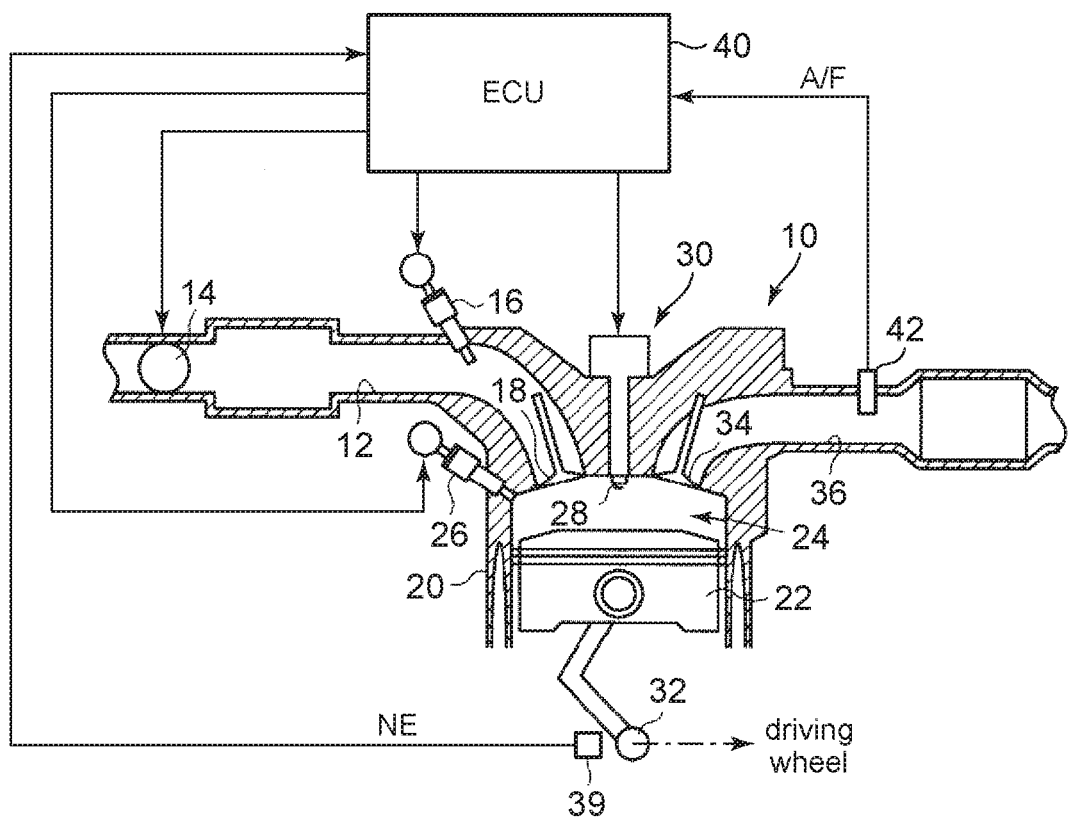
FIG. 1 is a configuration diagram of a system including a control apparatus for an internal combustion engine according to an embodiment of the present disclosure.

Hereinafter, an embodiment of a control apparatus for an internal combustion engine will be described with reference to the accompanying drawings. An internal combustion engine 10 shown in FIG. 1 is a spark-ignition multi-cylinder internal combustion engine. An electronically-controlled throttle valve 14 is provided in an intake passage 12 of the internal combustion engine 10 in order to provide a variable flow passage cross-sectional area of the intake passage 12. Port injection valves 16 are provided downstream of the throttle valve 14 in the intake passage 12. Each port injection valve 16 injects fuel into a corresponding intake port. Air inside the intake passage 12 and fuel injected from each port injection valve 16 are charged into a corresponding one of combustion chambers 24 as a result of valve opening action of a corresponding one of intake valves 18. Each combustion chamber 24 is defined by a cylinder 20 and a piston 22. An injection port of a cylinder injection valve 26 faces a corresponding one of the combustion chambers 24. Fuel is allowed to be directly supplied to each combustion chamber 24 by the use of a corresponding one of the cylinder injection valves 26. A spark plug 28 of an ignition device 30 protrudes into a corresponding one of the combustion chambers 24. A mixture of air and fuel, that is, air-fuel mixture, is ignited by using spark ignition generated by the corresponding spark plug 28, and air-fuel mixture is subjected to combustion. Part of combustion energy of air-fuel mixture is converted to the rotational energy of a crankshaft 32 via the corresponding piston 22. A drive wheel of a vehicle is allowed to be mechanically coupled to the crankshaft 32. The present embodiment assumes a vehicle including only the internal combustion engine 10 that imparts power to the drive wheel.

Air-fuel mixture subjected to combustion is emitted to an exhaust passage 36 as exhaust gas as a result of valve opening action of each exhaust valve 34. An ECU 40 is a control apparatus for the internal combustion engine 10. The ECU 40 acquires output values of various sensors, such as a crank angle sensor 39 and an air-fuel ratio sensor 42. The crank angle sensor 39 detects the rotation speed NE of the crankshaft 32. The air-fuel ratio sensor 42 detects the air-fuel ratio inside each combustion chamber 24 based on the components of exhaust gas. The ECU 40 controls controlled amounts (torque, exhaust characteristic, and the like) of the internal combustion engine 10 by operating various actuators, such as the throttle valve 14, the port injection valves 16, the cylinder injection valves 26 and the ignition device 30, based on the acquired output values.

Figure 2:
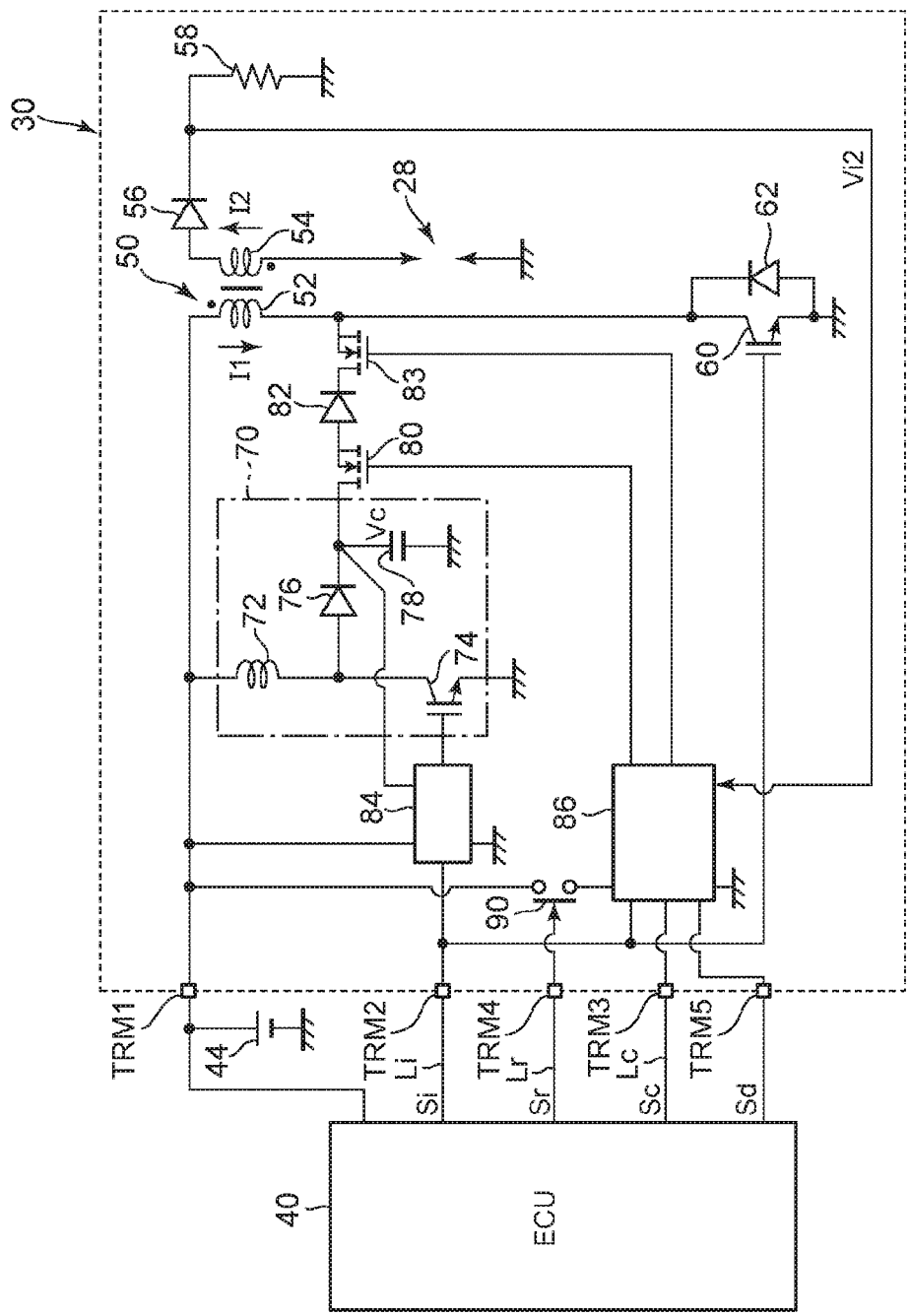
FIG. 2 is a circuit diagram that shows the circuit configuration of an ignition control system according to one or more embodiments shown and described herein.

FIG. 2 shows the circuit configuration of the ignition device 30. As shown in FIG. 2, the ignition device 30 includes an ignition coil 50 in which a primary coil 52 and a secondary coil 54 are magnetically coupled to each other. In FIG. 2, the black circle assigned to one of a pair of terminals of each of the primary coil 52 and the secondary coil 54 indicates a terminal at which, when a magnetic flux that links the primary coil 52 and the secondary coil 54 with each other is changed in a state where both ends of each of the primary coil 52 and the secondary coil 54 are open, the polarities of electromotive forces that are respectively generated in the primary coil 52 and the secondary coil 54 are equal to each other.

The spark plug 28 is connected to one of the terminals of the secondary coil 54, and the other terminal is grounded via a diode 56 and a shunt resistor 58. The diode 56 is a rectifying element that permits flow of current from the spark plug 28 toward a ground via the secondary coil 54 and that restricts flow of current in the opposite direction. The shunt resistor 58 is a resistor for detecting current that flows through the secondary coil 54 based on the voltage drop Vi2. In other words, the shunt resistor 58 is a resistor for detecting the discharge current of the spark plug 28.

The positive electrode of an external battery 44 is connected to one of the terminals of the primary coil 52 of the ignition coil 50 via a terminal TRM1 of the ignition device 30. The other terminal of the primary coil 52 is grounded via an ignition switching element 60. In the present embodiment, an insulated gate bipolar transistor (IGBT) is used as the ignition switching element 60. A diode 62 is connected in antiparallel with the ignition switching element 60.

Electric power introduced from the terminal TRM1 is also introduced into a step-up circuit 70. In the present embodiment, the step-up circuit 70 is formed of a step-up chopper circuit. That is, the step-up circuit 70 includes an inductor 72 of which one end is connected to the terminal TRM1 side, and the other end of the inductor 72 is grounded via a step-up switching element 74. In the present embodiment, an IGBT is used as the step-up switching element 74. The anode of the diode 76 is connected between the inductor 72 and the step-up switching element 74, and the cathode of the diode 76 is grounded via a capacitor 78. A charge voltage Vc of the capacitor 78 is the output voltage of the step-up circuit 70.

A point between the diode 76 and the capacitor 78 is connected to a point between the primary coil 52 and the ignition switching element 60 via a control switching element 80, a diode 82 and a cylinder selection switch 83. In other words, the output terminal of the step-up circuit 70 is connected between the primary coil 52 and the ignition switching element 60 via the control switching element 80, the diode 82 and the cylinder selection switch 83. In the present embodiment, MOS field effect transistors are used as the control switching element 80 and the cylinder selection switch 83. The diode 82 is a rectifying element for blocking backflow of current from the primary coil 52 and ignition switching element 60 side to the step-up circuit 70 via the parasitic diode of the control switching element 80 and the parasitic diode of the cylinder selection switch 83.

A step-up control unit 84 is a drive circuit that controls the output voltage of the step-up circuit 70 by opening or closing the step-up switching element 74 based on an ignition signal Si that is input to a terminal TRM2. The step-up control unit 84 monitors the output voltage of the step-up circuit 70 (the charge voltage Vc of the capacitor 78). When the output voltage is higher than or equal to a predetermined value, the step-up control unit 84 stops the opening/closing operation of the step-up switching element 74.

A discharge control unit 86 is a drive circuit that controls the discharge current of the spark plug 28 by opening or closing the control switching element 80 based on an ignition signal Si that is input to the terminal TRM2 and a discharge waveform control signal Sc that is input to a terminal TRM3. The electric power of the battery 44, which is introduced from the terminal TRM1 via a relay 90, is input to the discharge control unit 86. The relay 90 is an open/close device that is opened or closed by using a power supply command signal Sr that is input to a terminal TRM4. In other words, the relay 90 is a switch that switches between a continuity state where there is continuity between the discharge control unit 86 and the battery 44 and an interrupted state where the discharge control unit 86 and the battery 44 are interrupted from each other. When the relay 90 is set to an off state (interrupted state), the operating power supply of the discharge control unit 86 enters an off state.

The terminal TRM2 of the ignition device 30 is connected to the ECU 40 via an ignition communication line Li, and the terminal TRM3 is connected to the ECU 40 via a waveform control communication line Lc. The terminal TRM4 of the ignition device 30 is connected to the ECU 40 via a power supply command communication line Lr.

In a first mode in which the air-fuel ratio of the internal combustion engine 10 is controlled to a first target value (here, stoichiometric air-fuel ratio), the ECU 40 outputs the ignition signal Si via the ignition communication line Li, and does not output the discharge waveform control signal Sc to the waveform control communication line Lc. In a second mode in which the air-fuel ratio of the internal combustion engine 10 is controlled to a second target value that is leaner than the first target value, the ECU 40 outputs the ignition signal Si via the ignition communication line Li, and outputs the discharge waveform control signal Sc via the waveform control communication line Lc. The ignition signal Si and the discharge waveform control signal Sc both are logic high pulse signals in the present embodiment.

Next, control in the second mode will be particularly illustrated within ignition control according to the present embodiment with reference to FIG. 3A to FIG. 3G and FIG. 4A to FIG. 4D. FIG. 3A to FIG. 3G and FIG. 4A to FIG. 4D illustrate ignition control over a specific one cylinder. Although the cylinder selection switch 83 will not be particularly described, ignition control over the cylinder selected by the cylinder selection switch 83 is actually executed.

FIG. 3A shows changes in the ignition signal Si FIG. 3B shows changes in the discharge waveform control signal Sc. FIG. 3C shows changes in the state of opening or closing the ignition switching element 60. FIG. 3D shows changes in the state of opening or closing the step-up switching element 74. FIG. 3E shows changes in the state of opening or closing the control switching element 80. FIG. 3F shows changes in current I1 flowing through the primary coil 52. FIG. 3G shows changes in current I2 flowing through the secondary coil 54. The sign of each of the currents I1, I2 is defined such that the direction indicated by the arrow in FIG. 2 is positive.

As the ignition signal Si is input to the ignition device 30 at time t1, the ignition device 30 turns on (closes) the ignition switching element 60. Thus, the current I1 flowing through the primary coil 52 gradually increases. FIG. 4A shows the path of current flowing through the primary coil 52 at this time. As shown in FIG. 4A, as the ignition switching element 60 is closed, a first loop circuit that is a loop circuit including the battery 44, the primary coil 52 and the ignition switching element 60 becomes a closed loop circuit, and current flows through the closed loop circuit. Flux linkage of the secondary coil 54 gradually increases as a result of a gradual increase in current flowing through the primary coil 52, so electromotive force that cancels an increase in flux linkage is generated in the secondary coil 54. However, this electromotive force is such that the anode of the diode 56 is negative, so no current flows through the secondary coil 54.

As shown in FIG. 3A to FIG. 3G, as the ignition signal Si is input to the ignition device 30, the step-up control unit 84 opens or closes the step-up switching element 74. After that, the discharge waveform control signal Sc is input to the ignition device 30 at time t2 after a lapse of a delay time Td from time t1 at which the ignition signal Si has been input to the ignition device 30.

After that, at time t3, as the input of the ignition signal Si is stopped, that is, as the voltage of the ignition communication line Li is changed from a logic high voltage to a logic low voltage, the ignition device 30 opens the ignition switching element 60. Thus, the current I1 flowing through the primary coil 52 becomes zero, and current flows through the secondary coil 54 due to counter-electromotive force that is generated in the secondary coil 54. Thus, the spark plug 28 starts discharging.

FIG. 4B shows the path of current at this time. As shown in the drawing, as the flux linkage of the secondary coil 54 is about to reduce as a result of interruption of current of the primary coil 52, counter-electromotive force in the direction to cancel the reduction in flux linkage is generated in the secondary coil 54. Thus, the current I2 flows through the spark plug 28, the secondary coil 54, the diode 56 and the shunt resistor 58. As the current I2 flows through the secondary coil 54, a voltage drop Vd occurs in the spark plug 28, and a voltage drop "r×I2" commensurate with the resistance value of the shunt resistor 58 occurs in the shunt resistor 58. Thus, where a forward voltage drop, or the like, of the diode 56 is ignored, a voltage of the sum "Vd+r×I2" of the voltage drop Vd in the spark plug 28 and the voltage drop in the shunt resistor 58 is applied to the secondary coil 54. This voltage is to gradually reduce the flux linkage of the secondary coil 54. A gradual reduction in the current I2 flowing through the secondary coil 54 over the period of time t3 to time t4 in FIG. 3G is a phenomenon resulting from application of a voltage of "Vd+r×I2" to the secondary coil 54.

As shown in FIG. 3A to FIG. 3G, from time t4, the discharge control unit 86 opens or closes the control switching element 80. FIG. 4C shows a current path over the period of time t4 to time t5 during which the control switching element 80 is placed in a closed state. Here, a second loop circuit that is a loop circuit including the step-up circuit 70, the control switching element 80, the diode 82, the primary coil 52 and the battery 44 becomes a closed loop, and current flows through the second loop circuit.

FIG. 4D shows a current path over the period of time t5 to time t6 during which the control switching element 80 is placed in an open state. Here, a third loop circuit that is a loop circuit including the diode 62, the primary coil 52 and the battery 44 becomes a closed loop as a result of the fact that counter-electromotive force that cancels a change in magnetic flux due to a reduction in the absolute value of current flowing through the primary coil 52 is generated in the primary coil 52, and current flows through the third loop circuit.

If the time ratio D of a closed period Ton to one period T of the open/close operation of the control switching element 80 shown in FIG. 3E is manipulated, it is possible to control current flowing through the primary coil 52. The discharge control unit 86 executes control for gradually increasing the absolute value of the current I1 flowing through the primary coil 52 depending on the time ratio D. The sign of the current I1 over this period is inverse to the sign of the current I1 flowing through the primary coil 52 during times when the ignition switching element 60 is placed in a closed state. For this reason, where magnetic flux that is generated by the current I1 flowing through the primary coil 52 during times when the ignition switching element 60 is placed in a closed state is positive, the current I1 that is generated by opening or closing the control switching element 80 reduces magnetic flux. Here, when the rate of gradual reduction in the flux linkage of the secondary coil 54 resulting from the current I1 flowing through the primary coil 52 coincides with the rate of gradual reduction at the time when a voltage of "Vd+r×I2" is applied to the secondary coil 54, current flowing through the secondary coil 54 does not reduce. In this case, an electric power loss caused by the spark plug 28 and the shunt resistor 58 is compensated by electric power that is output from a power supply including the step-up circuit 70 and the battery 44.

In contrast, when the rate of gradual reduction in the flux linkage of the secondary coil 54 resulting from the current I1 flowing through the primary coil 52 is lower than the rate of gradual reduction at the time when a voltage of "Vd+r×I2" is applied to the secondary coil 54, the current I2 flowing through the secondary coil 54 gradually reduces. As a result of a gradual reduction in the current I2, flux linkage gradually reduces at the rate of gradual reduction at the time when a voltage of "Vd+r×I2" is applied to the secondary coil 54. However, the rate of gradual reduction in the current I2 flowing through the secondary coil 54 is lower than that when the absolute value of the current I1 flowing through the primary coil 52 does not gradually increase.

When the absolute value of the current I1 flowing through the primary coil 52 is gradually increased such that the actual rate of gradual reduction in flux linkage is higher than the rate of gradual reduction in the flux linkage of the secondary coil 54 at the time when a voltage of "Vd+r×I2" is applied to the secondary coil 54, the voltage of the secondary coil 54 increases due to counter-electromotive force that prevents or reduces a reduction in flux linkage. The current I2 flowing through the secondary coil 54 increases such that "Vd+r×I2" is equal to the voltage of the secondary coil 54.

As described above, by controlling the rate of gradual increase in the absolute value of the current I1 flowing through the primary coil 52, it is possible to control the current I2 flowing through the secondary coil 54. In other words, it is possible to control the discharge current of the spark plug 28 such that the discharge current increases or reduces.

The discharge control unit 86 manipulates the time ratio D of the control switching element 80 in order to execute feedback control over a discharge current value, which is determined based on a voltage drop Vi2 of the shunt resistor 58, to a discharge current command value I2*.

The ignition communication line Li, the ignition coil 50, the spark plug 28, the ignition switching element 60, the diode 62 and the cylinder selection switch 83, shown in FIG.

2, are provided cylinder by cylinder; however, FIG. 2 shows only one of each as a representative. In the present embodiment, as for each of the waveform control communication line Lc, the step-up circuit 70, the control switching element 80, the diode 82, the step-up control unit 84 and the discharge control unit 86, a single member is allocated for the plurality of cylinders. Based on which one of the cylinders the ignition signal Si that is input to the ignition device 30 corresponds to, the discharge control unit 86 selects and manipulates the corresponding cylinder selection switch 83. The step-up control unit 84 executes step-up control in response to the fact that the ignition signal Si of any one of the cylinders is input to the ignition device 30.

On the condition that the ignition signal Si is not input, the discharge control unit 86 controls discharge current to the discharge current command value I2* over the period from a lapse of a prescribed time from the leading edge of the ignition signal Si to the trailing edge of the discharge waveform control signal Sc. As shown in FIG. 3, the discharge control unit 86 variably sets the discharge current command value I2* based on the delay time Td of the timing at which the discharge waveform control signal Sc is input with respect to the timing at which the ignition signal Si is input to the ignition device 30. Thus, the ECU 40 is able to variably set the discharge current command value I2* by manipulating the delay time Td.

More specifically, in the present embodiment, the ECU 40 sets the discharge current command value I2* to a larger value and extends the delay time Td as the rotation speed NE increases. This is because the flow rate of air in the combustion chamber 24 is higher in the case where the rotation speed NE is high than in the case where the rotation speed NE is low. Therefore, the above setting is provided in consideration of a decrease in ignitability.

Figure 5:
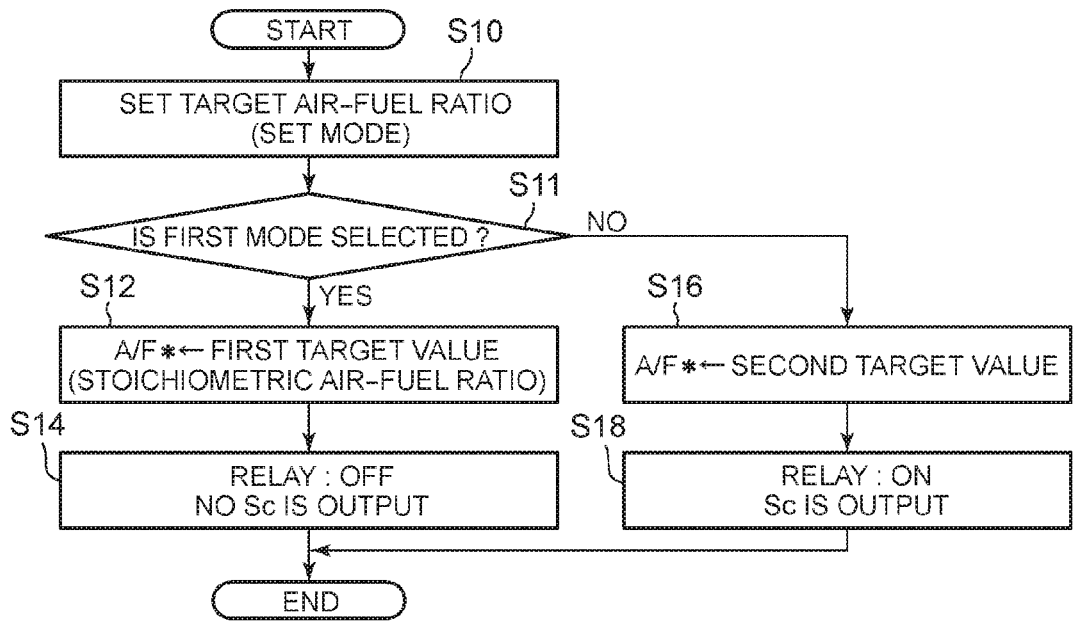
FIG. 5 is a flowchart that shows the procedure of the process of selecting whether to execute discharge current control according to one or more embodiments shown and described herein.

FIG. 5 shows the procedure of the process of selecting whether to cause the discharge control unit 86 to control discharge current according to the present embodiment. This process is, for example, repeatedly executed by the ECU 40 at predetermined intervals.

In this series of process, the ECU 40 initially sets a target air-fuel ratio (step S10). In other words, the ECU 40 determines whether the control mode is the first mode or the second mode. When the ECU 40 selects the first mode (YES in S11), the ECU 40 sets a target value A/F* to a first target value that is the stoichiometric air-fuel ratio (S12). Then, the ECU 40 sets the relay 90 to the off state, and executes ignition control by using only the ignition signal Si without outputting the discharge waveform control signal Sc (S14). When the relay 90 is opened (set to the off state), no electric power is supplied to the discharge control unit 86.

On the other hand, when the ECU 40 selects the second mode (NO in S11), the ECU 40 sets the target value A/F* to a second target value that is a predetermined air-fuel ratio leaner than the first target value (S16). Then, the ECU 40 sets the relay 90 to an on state (connected state), and executes ignition control by using the discharge waveform control signal Sc (S18). The process of step S18 corresponds to that, when control over the discharge current is not executed by the discharge control unit 86, air-fuel mixture is adjusted to a low ignition state where the ignitability of air-fuel mixture in the combustion chamber 24 is lower than or equal to a predetermined ignitability. That is, this is a process in the case where ignitability becomes lower than or equal to a predetermined ignitability when discharging of the spark plug 28 is started by placing the ignition switching element 60 in the closed state for a predetermined period and then setting the ignition switching element 60 to the open state and, after that, the spark plug 28 is discharged until the discharge current naturally becomes zero. Here, ignitability is defined in the present embodiment such that ignitability increases as an ignition delay that is a time required from the discharge timing (spark timing) of the spark plug 28 to ignition of air-fuel mixture in the combustion chamber 24 shortens. In the present embodiment, it is assumed that, when the ignitability is lower than or equal to the predetermined ignitability, air-fuel mixture has such a property that it is difficult to control ignition timing to desired timing by advancing the spark timing. That is, it is assumed that, as the spark timing is advanced, an ignition delay extends because of a decrease in the temperature of air-fuel mixture at the spark timing, and it becomes difficult to use the spark timing as a manipulation amount in compensating the ignition delay.

When the processes of step S14 and step S18 complete, the ECU 40 once ends the series of process shown in FIG. 5. Incidentally, in the present embodiment, the discharge control unit 86 also executes the process of diagnosing whether there is an abnormality in a discharge control system including a discharge control circuit, such as the discharge control unit 86 and the control switching element 80 that is operated by the discharge control unit 86, based on the voltage drop Vi2 of the shunt resistor 58 in the period of control over the discharge current. The diagnosed result is superimposed on a diagnosis result signal Sd, and is output to the ECU 40 via a terminal TRM5 shown in FIG. 2.

Figure 6:
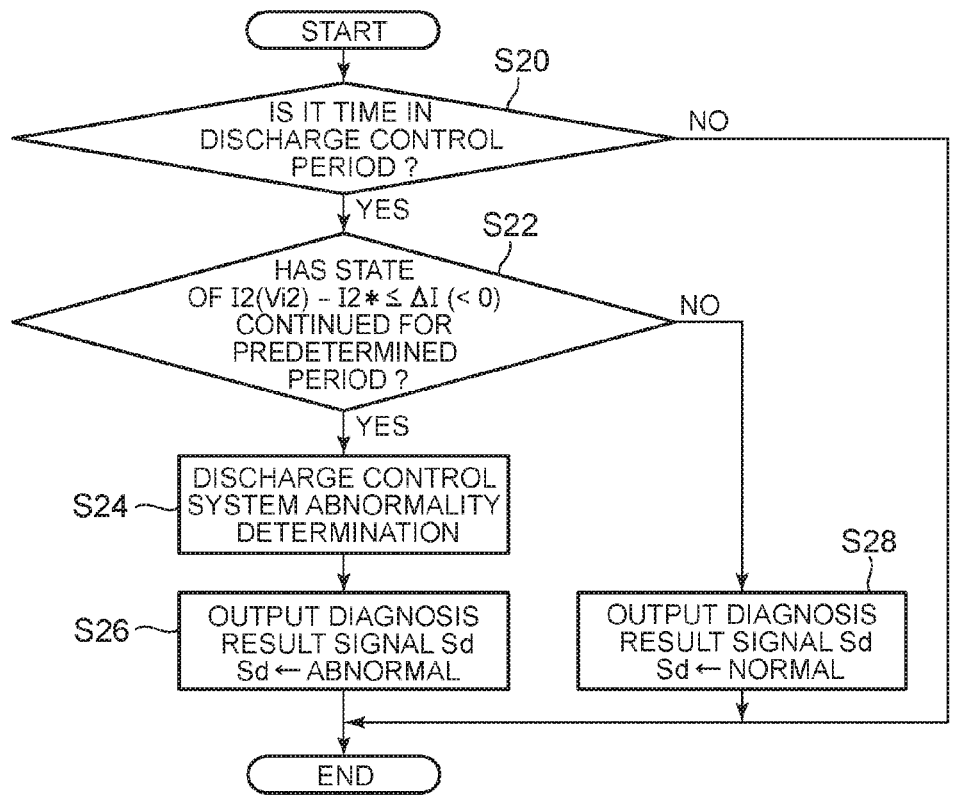
FIG. 6 is a flowchart that shows the procedure of an abnormality diagnosis process that is executed by a discharge control unit according to one or more embodiments shown and described herein.

FIG. 6 shows the procedure of the process of generating the diagnosis result signal Sd. This process is, for example, repeatedly executed by the discharge control unit 86 at predetermined intervals. The process shown in FIG. 6 is executed each spark timing of each cylinder; however, only the process at spark timing in a specific one cylinder is shown.

In the series of process shown in FIG. 6, the discharge control unit 86 initially determines whether it is the time in the period during which a command to control the discharge current is issued by using the discharge waveform control signal Sc (discharge control period) (S20). When the discharge control unit 86 determines that it is the time in the discharge control period (YES in S20), the discharge control unit 86 determines whether the state where the current I2 that is determined based on the voltage drop Vi2 is smaller by |ΔI(<0)| or more than the discharge current command value I2* has continued for a predetermined period (S22). In other words, where "I2*+ΔI" is a threshold, it is determined whether the state where the current I2 is smaller than or equal to the threshold smaller than the discharge current command value I2* has continued for the predetermined period. This process is to determine whether there is an abnormality in the discharge control system. The predetermined period is set to, when there occurs a phenomenon the current I2 suddenly becomes smaller than or equal to the threshold in the case where the discharge control system is normal, a period longer than the upper limit value of the duration of the phenomenon. The current I2 is a current in the specific cylinder for which control over the discharge current is executed. When the discharge control unit 86 determines that the above-described state has continued for the predetermined period (YES in S22), the discharge control unit 86 determines that there is an abnormality in the discharge control system (S24). The discharge control unit 86 outputs the diagnosis result signal Sd, on which diagnosis result information indicating that the discharge control system is abnormal is superimposed, to the ECU 40 (S26).

On the other hand, when the discharge control unit 86 determines that the above-described state has not continued for the predetermined time (NO in S22), the discharge control unit 86 outputs the diagnosis result signal Sd, on which diagnosis result information indicating that the discharge control system is normal is superimposed, to the ECU 40. When the process of step S26 or step S28 completes or when negative determination is made in step S20, the discharge control unit 86 once ends this series of process.

Figure 7:
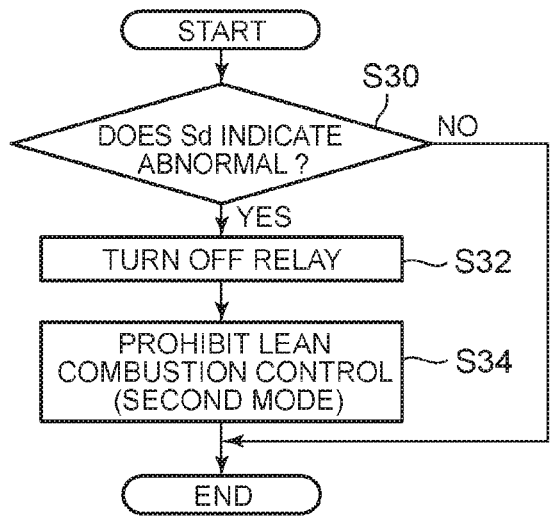
FIG. 7 is a flowchart that shows the procedure of a fail-safe process in the event of an abnormality according to one or more embodiments shown and described herein.

FIG. 7 shows the procedure of the process that is executed by the ECU 40 based on the diagnosis result signal Sd. This process is, for example, repeatedly executed by the ECU 40 at predetermined intervals. In the series of process shown in FIG. 7, the ECU 40 initially determines whether the diagnosis result signal Sd indicates that the discharge control system is abnormal (S30). When the ECU 40 determines that the diagnosis result signal Sd indicates that the discharge control system is abnormal (YES in S30), the ECU 40 determines that the discharge control system is abnormal, and opens the relay 90 (sets the relay 90 to the interrupted state) (S32). Subsequently, the ECU 40 prohibits the second mode, and executes combustion control over air-fuel mixture in only the first mode (S34).

When the process of step S34 completes or when negative determination is made in step S30, the ECU 40 once ends this series of process. When there is an abnormality in the discharge control system as a result of the above process, the first mode is selected, and discharge control that is executed by the discharge control unit 86 is avoided. The first mode is a mode in which, even when discharge control is not executed by the discharge control unit 86, it is possible to sufficiently ensure the ignitability of air-fuel mixture.

Figure 8:
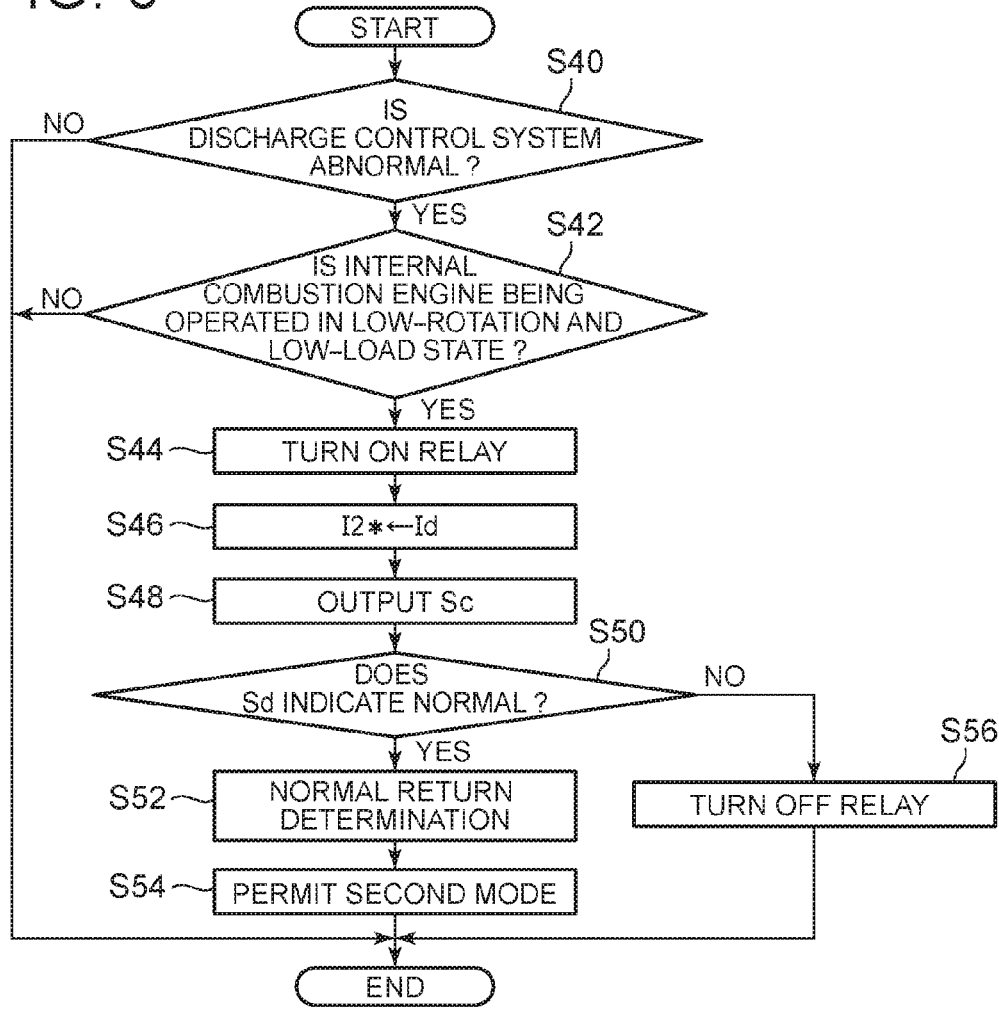
FIG. 8 is a flowchart that shows the procedure of a return determination and return process according to one or more embodiments shown and described herein.

Next, the process regarding normal return determination from an abnormality of the discharge control system by the ECU 40 will be described. FIG. 8 shows the procedure of a return determination and return process. This process is, for example, repeatedly executed by the ECU 40 at predetermined intervals.

In the series of process shown in FIG. 8, the ECU 40 initially determines whether the discharge control system is abnormal (S40). When the ECU 40 determines that the discharge control system is abnormal (YES in S40), the ECU 40 determines whether the internal combustion engine 10 is being operated in a low-rotation and low-load state where the rotation speed NE of the internal combustion engine 10 is lower than or equal to a predetermined speed and the load of the internal combustion engine 10 is smaller than or equal to a predetermined value (S42). This process is to determine whether a condition for causing the discharge control unit 86 to control the discharge current is satisfied in order to determine whether the discharge control system has returned to the normal state.

The condition that the rotation speed NE is lower than or equal to the predetermined speed is to decrease the voltage between both electrodes of the spark plug 28, which is required in controlling the discharge current. That is, when the rotation speed NE is high, the flow rate of air in the combustion chamber 24 increases and, as a result, discharge current is elongated, so the voltage between the pair of electrodes of the spark plug 28 increases. This leads to an increase in discharge energy. On the other hand, the condition that the load is smaller than or equal to the predetermined value is a setting for reducing the consumption electric power of the ignition device 30. That is, the voltage between both electrodes of the spark plug 28 for achieving a predetermined discharge current is higher in the case where the load is large than in the case where the load is small. This leads to an increase in discharge energy. In the present embodiment, by setting low-rotation and low-load operation for a condition, the probability of a situation that the ignition device 30 exhibits a behavior different from a normal behavior and, as a result, the ignition device 30 overheats is minimized by restricting control over discharge energy.

When the ECU 40 determines that the internal combustion engine 10 is being operated in a low-rotation and low-load state (YES in S42), the ECU 40 closes the relay 90 (sets the relay 90 to a connected state) (S44). The ECU 40 sets the discharge current command value I2* to a diagnosis command value Id (S46). The diagnosis command value Id is set to a value smaller than the minimum value that is set as the discharge current command value I2* when the discharge control system is normal. One of the reasons for this setting is that the combustion temperature of air-fuel mixture in the combustion chamber 24 is higher in the first mode than in the second mode. That is, control over the discharge current by the discharge control unit 86 is usually executed in the second mode in which the combustion temperature of air-fuel mixture is lower than that in the first mode. For this reason, when control over the discharge current by the discharge control unit 86 is executed exceptionally in the first mode, there is a concern that the temperature of the ignition device 30, such as the ignition coil 50, excessively increases in the case where control over the discharge current similar to that during normal times is executed. For this reason, the discharge current command value I2* is set to a value smaller than that during normal times.

The ECU 40 outputs the discharge waveform control signal Sc to the ignition device 30 such that the discharge current command value I2* becomes the diagnosis command value Id (S48). After that, the ECU 40 receives the diagnosis result signal Sd from the ignition device 30, and determines whether the diagnosis result signal Sd indicates that the discharge control system is normal (S50). When the ECU 40 determines that the diagnosis result signal Sd indicates that the discharge control system is normal (YES in S50), the ECU 40 determines that the discharge control system has returned from the abnormal state (S52). The ECU 40 permits shifting into the second mode (S54). Thus, in the process of step S10 shown in FIG. 5, the second mode is permitted to be set as needed.

In contrast, when the diagnosis result signal Sd does not indicate that the discharge control system is normal (NO in S50), the ECU 40 opens the relay 90 (sets the relay 90 to an interrupted state) (S56). Thus, air-fuel ratio feedback control is executed while the set target air-fuel ratio is limited to the first target value.

When the process of step S54 or step S56 completes or when negative determination is made in step S40 or step S42, the ECU 40 once ends this series of process. Incidentally, when affirmative determination is made in step S30 of FIG. 7, the ECU 40 may provide a user with notification that there is an abnormality. Instead, after affirmative determination is made in step S30, the ECU 40 may provide notification that there is an abnormality on the condition that the number of times negative determination is made in the process of step S50 of FIG. 8 becomes a predetermined number of times.

The operation of the present embodiment will be described. When the ECU 40 determines that there is an abnormality in the discharge control system based on the diagnosis result signal Sd, the ECU 40 executes air-fuel ratio feedback control by limiting the air-fuel ratio to the first target value, thus avoiding control over the discharge current by the discharge control unit 86. When the air-fuel ratio is the first target value, the ignitability of air-fuel mixture is sufficiently ensured even when the discharge control unit 86 is not caused to control the discharge current.

After that, because the internal combustion engine 10 is operated in a low-rotation and low-load state, the ECU 40 causes the discharge control unit 86 to control the discharge current by setting the discharge current command value I2* to the diagnosis command value Id smaller than the minimum value during normal times. Accordingly, the discharge control unit 86 controls the discharge current to the diagnosis command value Id. When the discharge current becomes larger than or equal to the threshold as a result of this control, it is determined that the discharge control system has returned from the abnormal state to the normal state, and the diagnosis result signal Sd on which the determined result is superimposed is output to the ECU 40. On the other hand, the ECU 40 determines that the discharge control system has returned to the normal state based on the diagnosis result signal Sd, and permits to set the target value in air-fuel ratio control to the second target value. Thus, in the process of step S10 of FIG. 5, the ECU 40 sets the target value to the second target value where necessary. As a result, the air-fuel ratio in the combustion chamber 24 is set to a predetermined air-fuel ratio leaner than the stoichiometric air-fuel ratio, so it is possible to reduce fuel consumption.

According to the above-described present embodiment, the following advantageous effects are obtained.

(1) When it is determined that there is an abnormality in the discharge control system, ignition control is executed while avoiding control over the discharge current by the discharge control unit 86, and, after that, it is determined whether the discharge control system has returned from the abnormal state by causing the discharge control unit 86 to control the discharge current. For this reason, after it is determined that there is an abnormality, when the discharge control system is allowed to be utilized normally (when the discharge control system has returned to the normal state), it is possible to detect that the discharge control system has returned to the normal state.

Particularly, the discharge current command value I2* in control over the discharge current for determining whether the discharge control system has returned to the normal state is set to a value smaller than that during normal times. Thus, it is possible to suitably prevent an excessively high temperature of the ignition device 30 depending on the type of abnormality. That is, for example, when the type of abnormality is an abnormality in the operation of the cylinder selection switch 83, the primary coil 52 of a specific cylinder can be repeatedly energized even during the period of control over discharge current of another cylinder, and, in this case, the temperature of the ignition coil 50 of the specific cylinder can excessively increase. In contrast, by setting the discharge current command value I2* to a value smaller than that during normal times, it is possible to minimize an excessive increase in the temperature of the ignition coil 50 of the specific cylinder.

(2) When the ECU 40 determines that there is an abnormality in the discharge control system, the ECU 40 limits the target value in air-fuel ratio control to the first target value. Thus, even when the discharge control unit 86 is not caused to control the discharge current, it is possible to ensure the ignitability of air-fuel mixture.

(3) In the first mode, the ECU 40 causes the discharge control unit 86 to control the discharge current in order to determine whether the discharge control system has returned to the normal state, and sets the discharge current command value I2* at that time to a value smaller than the minimum value during normal times. Thus, because of the fact that the discharge control unit 86 is caused to control the discharge current in the first mode in which the combustion temperature of air-fuel mixture is higher than that in the case where the discharge control unit 86 is caused to control the discharge current during normal times, it is possible to prevent an excessively high temperature of the ignition device 30.

(4) On the condition that the rotation speed NE of the internal combustion engine 10 is lower than or equal to the predetermined speed, the discharge control unit 86 is caused to control the discharge current in order to determine whether the discharge control system has returned to the normal state. For this reason, elongation of the discharge current by air flow is prevented or reduced, so the voltage between both electrodes of the spark plug 28, which is required in controlling the discharge current to the discharge current command value I2*, decreases. Therefore, it is possible to limit discharge energy, and, by extension, it is possible to prevent or reduce heat generation of the ignition device 30.

(5) On the condition that the load of the internal combustion engine 10 is smaller than or equal to the predetermined value, the discharge control unit 86 is caused to control the discharge current in order to determine whether the discharge control system has returned to the normal state. For this reason, the voltage between both electrodes of the spark plug 28, which is required in controlling the discharge current to the discharge current command value I2*, decreases. Therefore, it is possible to limit discharge energy, and, by extension, it is possible to prevent or reduce heat generation of the ignition device 30.

(6) When the detected value of the discharge current in the period during which the discharge control unit 86 is caused to control the discharge current is smaller than or equal to the threshold, it is determined that there is an abnormality. For this reason, a situation that the discharge control unit 86 is not normally caused to control the discharge current and the purpose of improving the ignitability of air-fuel mixture is not achieved is accurately recognized.

(7) The discharge control unit 86 is caused to control the discharge current for determining whether the discharge control system has returned to the normal state at ordinary spark timing. Thus, it is possible to prevent an excessively high temperature of the ignition device 30 and an increase in the electric power consumption of the ignition device 30. That is, for example, when the discharge control unit 86 is caused to control the discharge current at timing different from the ordinary spark timing, the ignition signal Si and the discharge waveform control signal Sc are output at this timing different from the spark timing. For this reason, ignition control is executed twice in one combustion cycle (four strokes), so the temperature of the ignition device 30 easily increases.

Next, other embodiments as alternative embodiments to the above-described embodiment will be described. That is, at least one of the characteristics of the above-described embodiment may be changed as follows. The following description contains a portion in which the correspondence relationship between the characteristics described in SUMMARY and the characteristics in the above-described embodiment is illustrated by reference numerals, or the like, and this is not intended to limit the above-described characteristics in accordance with the illustrated correspondence relationship. An example of avoidance of control over discharge current, described in SUMMARY, corresponds to causing the ECU 40 to executes the process of step S34.

First, an alternative embodiment of detecting an abnormality of the ignition device will be described. Instead of the condition that the state where an actual discharge current is smaller than or equal to the threshold has continued for the predetermined period, for example, it may be determined that there is an abnormality when a detected value of the discharge current at predetermined timing in the last half of the period during which the discharge control unit 86 is caused to control the discharge current. Alternatively, for example, it may be determined that there is an abnormality when a value obtained by subjecting the detected value to low-pass filter processing is smaller than or equal to a threshold. Alternatively, the number of discharge control periods on which it is determined that the above-described state has continued for the predetermined period may be counted, and it is determined whether there is an abnormality based on the counted number.

An input parameter for determining whether there is an abnormality in causing the discharge control unit 86 to control the discharge current is not limited to the voltage drop Vi2. For example, a current transformer or a Hall sensor may be provided between the spark plug 28 and the secondary coil 54, and a discharge current that is detected by one of them may be used as an input parameter.

The present disclosure is not limited to the one that detects an abnormality based on the discharge current during times when the discharge control unit 86 is caused to control the discharge current. For example, when the internal combustion engine 10 includes a plurality of cylinders, an abnormality may be detected when variations among the cylinders in frequency that the cylinder selection switch 83 provided cylinder by cylinder is closed are large or when variations among the cylinders in current flowing through the cylinder selection switch 83 provided cylinder by cylinder are large.

Alternatively, for example, an abnormality may be detected based on current flowing through the primary coil 52. This is, for example, implemented by detecting an abnormality when the amount of increase in current flowing through the primary coil 52 is small for the time ratio D.

Furthermore, the present disclosure is not limited to detecting such an abnormality that the discharge current reduces. For example, the present disclosure may be configured to detect such an abnormality that the discharge current becomes excessive. In this case as well, by determining whether the discharge control system has returned to the normal state after there occurs an abnormality, it is effective to permit the second mode by which it is possible to reduce fuel consumption in synchronization with control by the discharge control unit 86 when the discharge control system has returned to the normal state.

Next, another alternative embodiment of an entity of generating the diagnosis result signal Sd will be described. Not limited to the discharge control unit 86, for example, a device, such as a hardware component, different from the discharge control unit 86 may be used. In this case, this exclusive device may be supplied with electric power when the operating power supply of the discharge control unit 86 is interrupted as well.

Next, an alternative embodiment of abnormality determination process (S30) will be described. Not limited to the one that determines whether there is an abnormality based on the diagnosis result signal Sd from the ignition device 30, for example, the voltage drop Vi2 may be acquired from the ignition device 30, and it may be determined whether there is an abnormality based on the voltage drop Vi2.

Next, an alternative embodiment of determining whether the discharge control system has returned to the normal state (FIG. 8) will be described. In the above-described embodiment, it is determined that the discharge control system is normal as a result of the fact that the diagnosis result signal Sd once indicates that the discharge control system is normal; however, the present disclosure is not limited to this configuration. It may be determined that the discharge control system is normal when the diagnosis result signal Sd indicates successively multiple times that the discharge control system is normal.

In the above-described embodiment, the discharge control unit 86 is caused to control the discharge current while the discharge current command value I2* is set to the diagnosis command value Id smaller than the minimum value of the discharge current command value I2* during normal times; however, the present disclosure is not limited to this configuration. For example, the diagnosis command value Id may be set to the minimum value of the discharge current command value I2* during normal times.

Causing the discharge control unit 86 to control the discharge current on the condition that the rotation speed of the internal combustion engine 10 is lower than or equal to the predetermined speed is not indispensable. Even when this condition is not provided, the advantageous effect described in (1) is obtained.

Causing the discharge control unit 86 to control the discharge current on the condition that the load of the internal combustion engine 10 is smaller than or equal to the predetermined value is not indispensable. Even when this condition is not provided, the advantageous effect described in (1) is obtained.

In the above-described embodiment, when the rotation speed is lower than or equal to the predetermined speed and the load is smaller than or equal to the predetermined value, the discharge control unit 86 is caused to control the discharge current; however, the condition for causing the discharge control unit 86 to control the discharge current is not limited to this configuration. For example, the fact that a predetermined time has elapsed from when it is determined that there is an abnormality may be added to the condition. Alternatively, when it is determined that the discharge control system has not returned as a result of cancelling avoidance process and then causing the discharge control unit 86 to control the discharge current, the fact that a predetermined time has elapsed from that determination may be added to the condition. When the number of times the avoidance process is cancelled and then the discharge control unit 86 is caused to control the discharge current has reached a predetermined number of times, the process of cancelling the avoidance process and causing the discharge control unit 86 to control the discharge current does not need to be executed any more.

Next, an alternative embodiment of low ignition process (S16) will be described. The present disclosure is not limited to the configuration that air-fuel ratio feedback control is executed by setting the target value A/F* to the second target value leaner than the stoichiometric air-fuel ratio. For example, the configuration that an EGR ratio that is the ratio of an EGR amount in fluid flowing into the combustion chamber 24 is controlled to a predetermined ratio or higher may be employed. In this case as well, the ignitability of air-fuel mixture in the case where the discharge control unit 86 is not caused to control the discharge current can be lower than or equal to a predetermined ignitability.

Next, an alternative embodiment of abnormal-time process (S34) will be described. In addition to setting the first mode, the process of limiting the EGR ratio may be executed. The present disclosure is not limited to the configuration that the first mode is set when it is determined that there is an abnormality. For example, in the case where the target value A/F* of the first mode is leaner than the stoichiometric air-fuel ratio, the target value A/F* may be controlled to the stoichiometric air-fuel ratio when there occurs an abnormality.

As described in the alternative embodiment of the low ignition process, when the low ignition process is to control the EGR ratio to a value higher than or equal to a predetermined ratio, the EGR ratio may be controlled to a value lower than the predetermined ratio when there is an abnormality. In this case as well, when the EGR ratio is controlled to a value smaller than the predetermined ratio in comparison with during normal times when the EGR ratio is higher than or equal to the predetermined ratio, the combustion temperature of air-fuel mixture in the combustion chamber 24 rises. Therefore, in order to prevent an excessively high temperature of the ignition device 30, it is effective to set the discharge current command value I2*, which is used to determine whether the discharge control system has returned from the abnormal state, to a small value.

Next, an alternative embodiment of execution command process (S18) will be described. Not limited to the one that superimposes the discharge current command value I2* on the discharge waveform control signal Sc, the discharge current command value I2* may be transmitted to the ignition device 30 via another communication line.

The execution command process is not indispensable. For example, when there is no abnormality in the discharge control system, the discharge control unit 86 may be caused to constantly control the discharge current. An alternative embodiment of the discharge control unit will be described. The present disclosure is not limited to the configuration that the detected value of the discharge current value is controlled to the discharge current command value I2* in a feedback manner. The configuration may be such that the detected value of the discharge current value may be controlled to the discharge current command value I2* in an open loop manner. In this case as well, it is effective to detect that there is an abnormality as a result of the fact that the discharge current becomes smaller than or equal to the threshold. Open loop control is allowed to be implemented by variably setting the time ratio of the open/close operation of the control switching element 80 in response to the discharge current command value I2*. However, in this case, at the time of setting the time ratio, it is desirable to take the load of the internal combustion engine 10 into consideration.

Next, an alternative embodiment of the discharge control circuit (70, 80, 82, 83) will be described. The configuration that the first power supply is the battery 44 and the second power supply is a combination of the battery 44 and the step-up circuit 70 is not determined. For example, a circuit that is able to connect the battery 44 to the primary coil 52 such that the voltage having a reverse polarity to that when the ignition switching element 60 is closed is applied to the primary coil 52 may be provided. In this case, both the first power supply and the second power supply are the battery 44.

The present disclosure is not limited to the one that energizes the primary coil 52 in order to control the discharge current of the spark plug 28. For example, other than the primary coil 52, a third coil magnetically coupled to the secondary coil 54 may be energized. In this case, both ends of the third coil are electrically insulated over the period during which the ignition switching element 60 is closed, and the third coil is energized as in the case where the primary coil 52 is energized in the above-described embodiment after the ignition switching element 60 is opened.

The present disclosure is not limited to the configuration that a discharge of the spark plug 28 does not occur while the ignition switching element 60 is closed. For example, a discharge from one electrode of the spark plug 28 to the other electrode may be caused by closing the ignition switching element 60, and a discharge from the other electrode to the one electrode may be caused by counter-electromotive force that is generated in the secondary coil 54 by opening the ignition switching element 60. In this case as well, after the start of a discharge from the other electrode to the one electrode, it is effective to provide the discharge control circuit that retains the discharge current.

Next, an alternative embodiment of the internal combustion engine will be described. Not only an internal combustion engine that imparts power to the drive wheel of a vehicle but also an internal combustion engine that is mounted on, for example, a series hybrid vehicle, may be employed.

What is claimed is:

1. A control apparatus for an internal combustion engine, the control apparatus comprising:
   an ignition device including a spark plug, an ignition coil, a discharge control circuit and a discharge control unit, the spark plug being provided in a combustion chamber of the internal combustion engine, the ignition coil being connected to the spark plug, the discharge control circuit being configured to retain discharge current after a start of discharging of the spark plug, and the discharge control unit being configured to control the discharge current by operating the discharge control circuit; and
   an electronic control unit configured to
   (i) control a controlled amount of the internal combustion engine by operating the ignition device,
   (ii) determine whether there is an abnormality in at least one of the discharge control unit and the discharge control circuit,
   (iii) when the electronic control unit determines that there is the abnormality in at least one of the discharge control unit and the discharge control circuit, avoid control over the discharge current by the discharge control unit, and
   (iv) after the electronic control unit determines that there is the abnormality in at least one of the discharge control unit and the discharge control circuit, cancel avoidance of control over the discharge current, and determine whether the at least one of the discharge control unit and the discharge control circuit has returned from the abnormality by causing the discharge control unit to execute control for bringing the discharge current to a discharge current smaller than or equal to a minimum value during times when the electronic control unit does not determine that there is the abnormality.

2. The control apparatus according to claim 1, wherein the electronic control unit is configured to
   (i) when the discharge control unit is not caused to control the discharge current after a start of discharging of the spark plug, adjust air-fuel mixture in the combustion chamber to a low ignition state where ignitability of the air-fuel mixture is lower than or equal to a predetermined ignitability, (ii) when the air-fuel mixture has been adjusted to the low ignition state, cause the discharge control unit to control the discharge current, (iii) when the electronic control unit determines that there is the abnormality in at least one of the discharge control unit and the discharge control circuit, stop adjusting the air-fuel mixture to the low ignition state, and, when the discharge control unit is not caused to control the discharge current after the start of discharging of the spark plug, adjust the air-fuel mixture in the combustion chamber to a high ignition state where ignitability of the air-fuel mixture exceeds the predetermined ignitability, and (iv) cancel avoidance of control over the discharge current during times when the air-fuel mixture is placed in the high ignition state, and cause the discharge control unit to control the discharge current.

3. The control apparatus according to claim 2, wherein the electronic control unit is configured to (i) control an air-fuel ratio of air-fuel mixture in the combustion chamber to a value larger than or equal to a predetermined air-fuel ratio leaner than a stoichiometric air-fuel ratio, and (ii) control the air-fuel ratio of air-fuel mixture in the combustion chamber to a value smaller than the predetermined air-fuel ratio.

4. The control apparatus according to claim 1, wherein the electronic control unit is configured to, on a condition that a rotation speed of the internal combustion engine is lower than or equal to a predetermined speed, cancel avoidance of control over the discharge current, and cause the discharge control unit to control the discharge current.

5. The control apparatus according to claim 1, wherein the electronic control unit is configured to, on a condition that a load of the internal combustion engine is smaller than or equal to a predetermined value, cancel avoidance of control over the discharge current, and cause the discharge control unit to control the discharge current.

6. The control apparatus according to claim 1, wherein the electronic control unit is configured to, when a detected value of discharge current in a period during which the discharge control unit is caused to control the discharge current is smaller than or equal to a threshold, determine that there is the abnormality.

7. The control apparatus according to claim 1, wherein the ignition device includes an ignition switching element and a control switching element, the ignition switching element is configured to open or close a first loop circuit including a first power supply and a primary coil of the ignition coil, and the control switching element is configured to open or close a second loop circuit including a second power supply and the primary coil, the discharge control circuit includes the control switching element, and the discharge control unit is configured to (i) discharge the spark plug by using electromotive force that is generated in a secondary coil of the ignition coil as a result of switching of the ignition switching element from a closed state to an open state, (ii) after discharging of the spark plug, control the discharge current of the spark plug by opening or closing the control switching element, and (iii) a polarity of voltage that is applied by the first power supply to the primary coil during times when the first loop circuit is a closed loop and a polarity of voltage that is applied by the second power supply to the primary coil during times when the second loop circuit is the closed loop are reverse from each other.

* * * * *